Oct. 15, 1940.　　W. F. PECK ET AL　　2,217,991
DEMONSTRATOR
Filed Jan. 2, 1937　　3 Sheets-Sheet 1
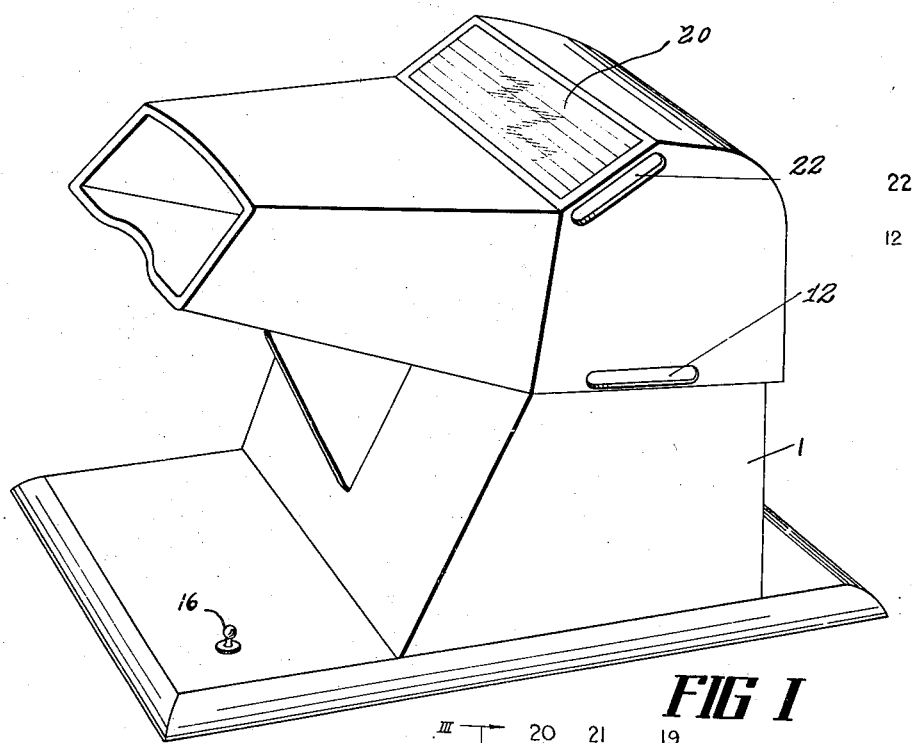
FIG I
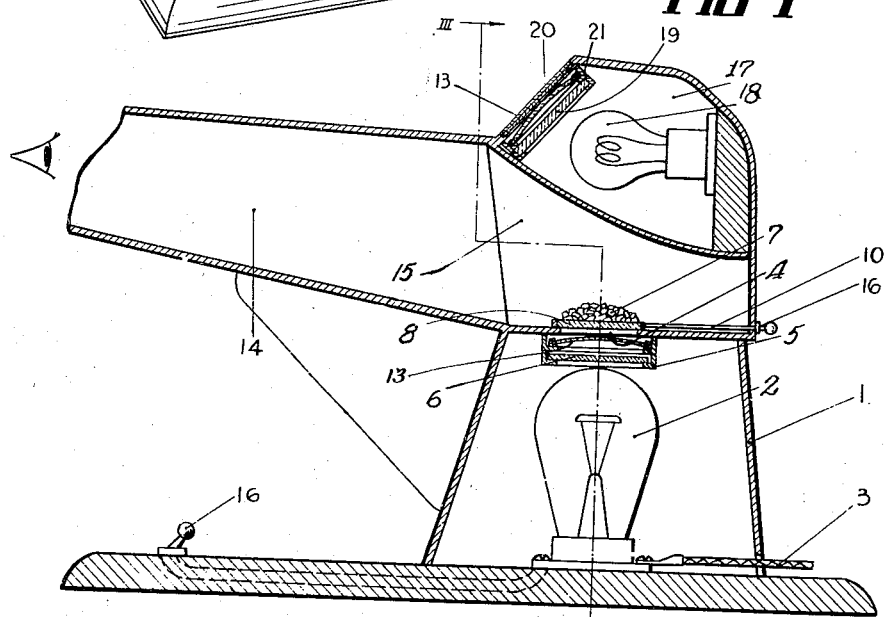
FIG II
INVENTORS
James Y. Taylor
William F. Peck
BY
Harry H. Styll
ATTORNEY Oct. 15, 1940.   W. F. PECK ET AL   2,217,991
DEMONSTRATOR
Filed Jan. 2, 1937   3 Sheets-Sheet 2
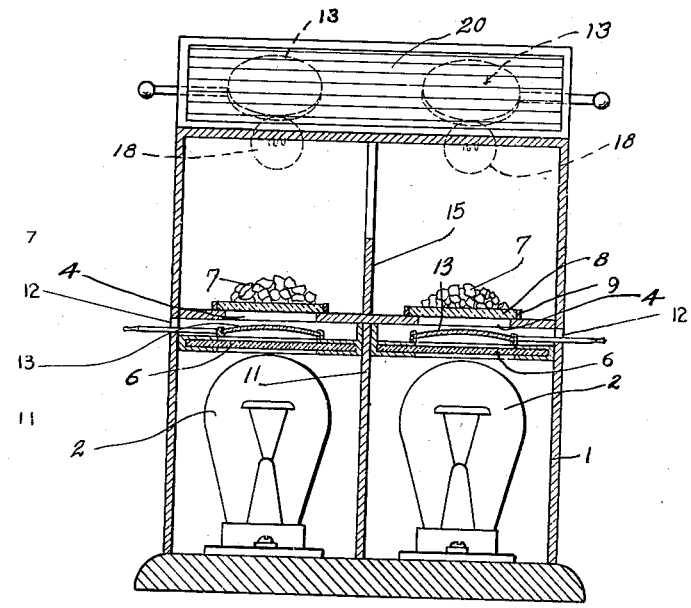
FIG III
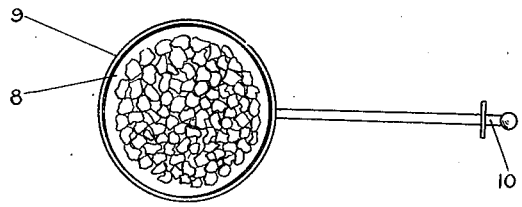
FIG IV
INVENTORS
James Y. Gaylor
William F. Peck
BY
Harry H. Styll
ATTORNEY Oct. 15, 1940.                W. F. PECK ET AL                    2,217,991
                                DEMONSTRATOR
                             Filed Jan. 2, 1937              3 Sheets-Sheet 3
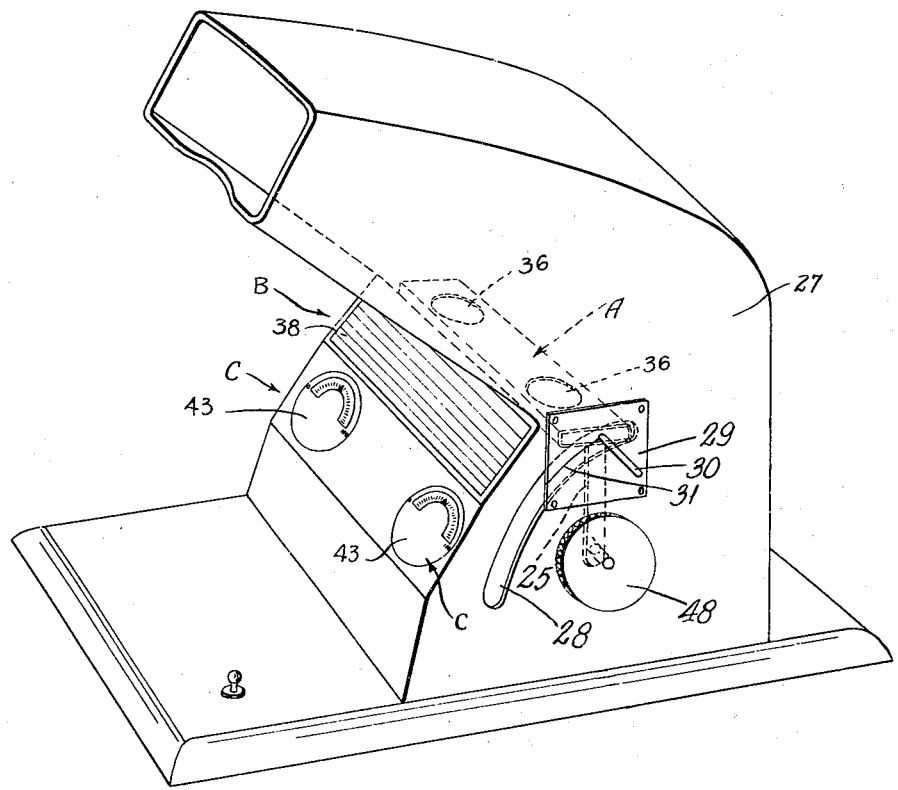
FIG. V
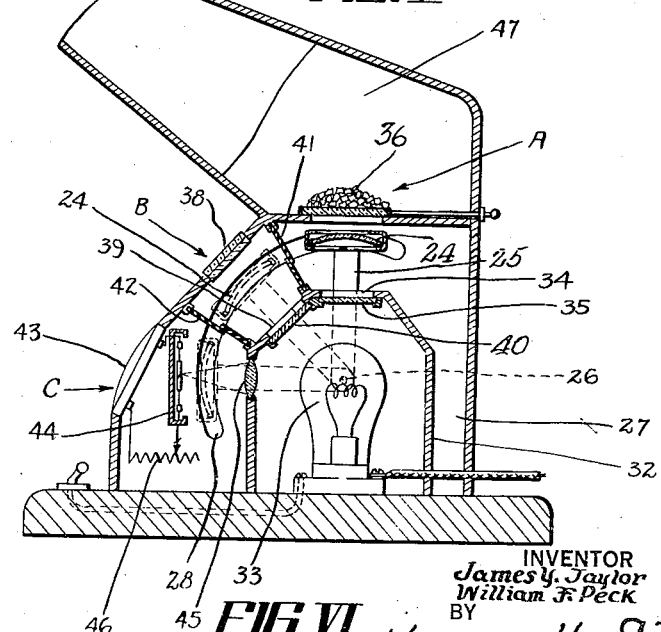
FIG. VI
INVENTOR
James Y. Taylor
William F. Peck
BY Harry H. Styll
ATTORNEY Patented Oct. 15, 1940

2,217,991

UNITED STATES PATENT OFFICE 2,217,991

DEMONSTRATOR

William F. Peck, Sturbridge, and James Y. Taylor, Southbridge, Mass., assignors to American Optical Company, Southbridge, Mass., a voluntary association of Massachusetts Application January 2, 1937, Serial No. 118,768

3 Claims. (Cl. 250—53)

This invention relates to comparative demonstrators and has particular reference to improved means and method of making the same.

One of the principal objects of the invention is to provide novel means and method of comparing relatively the absorption properties of vitreous or glass compositions or articles thereof over a predetermined wave length range.

Another object of the invention is to provide means and method of demonstrating the absorption properties of various different commercial ophthalmic lenses for ultra-violet radiation, that range of the visible spectrum lying between the ultra-violet region and the infra-red and for infra-red radiation.

Another object is to provide means for producing ultra-violet radiations with fluorescent material aligned with said radiations and arranged in such a manner that lenses may be placed so as to intercept the beam of ultra-violet radiations prior to entering the fluorescent means.

Another object is to provide means for demonstrating the type of test radiations used during the comparative demonstration made by the device.

Another object is to provide improved means and method in combination with means of the above character for comparing the color absorption of vitreous or glass compositions or articles made of said compositions.

Another object is to provide means having a source of diffused illumination in combination with means for producing selected groups of colors adapted to be illuminated by said diffused light, and by which the color absorption properties of lenses having different physical characteristics may be compared by placing the lenses between the diffused light and the selected groups of colors, or by placing the lenses over the selected group of colors so that the colored light may pass through the lenses.

Another object is to provide improved means and method of comparing the physical characteristics of lenses as regards their effect upon the wave length range including the region of the ultra-violet, visible spectrum and infra-red region.

Another object is to provide a portable unit having the above characteristics.

Other objects and advantages of the invention will become apparent from the following description taken in connection with the accompanying drawings. It will be apparent that many changes may be made in the details of construction, arrangement of parts and methods shown and described without departing from the spirit of the invention as expressed in the accompanying claims. We, therefore, do not wish to be limited to the exact details and methods shown and described, as the preferred forms only have been set forth by way of illustration.

Referring to the drawings:

Fig. I is a perspective view of the device embodying the invention;

Fig. II is a sectional side view of the device shown in Fig. I;

Fig. III is a sectional view taken on line III—III of Fig. II;

Fig. IV is a plan view of the fluorescent unit;

Fig. V is a perspective view of a modified form of the invention; and

Fig. VI is a transverse sectional view through the device shown in Fig. V.

There have been made, in the past, and there are now in present use, many different compositions intended for use as protective means against ultra-violet or infra-red radiations. Such compositions in some instances have been found to have desirable characteristics as regards ultra-violet or infra-red absorption but greatly affect the transmission of the visible spectrum. On the other hand, some have desirable characteristics as regards the transmission of the visible spectrum but are deficient as regards ultra-violet or infra-red absorption. In general it has been found that many materials or articles created to have, and which are claimed to have, specified absorption and transmission limits differ greatly in their ability to fulfill said specified requirements.

One of the prime objects, therefore, of this invention, is to provide simple and efficient means and method whereby a quick direct comparison may be made of the relative ultra-violet or infra-red absorption properties of different materials or lenses formed of said materials and the effect that these materials or lenses have on the visible spectrum.

Referring more particularly to the drawings wherein like characters of reference designate like parts throughout the several views, the device embodying the invention comprises a housing 1 formed with two spaced compartments each having a source of ultra-violet radiation 2 therein. The ultra-violet radiation in this particular instance is produced by an Argon Glow Lamp connected by the lead wires 3 to any suitable source of electric energy. It is to be understood, however, that the said ultra-violet radiation may be produced by any suitable known means.

Each compartment is provided, in the upper wall thereof, with an opening 4 in alignment with each source of ultra-violet radiation 2. Between the source of ultra-violet radiation and in alignment with the opening 4, there is supported, by a bracket 5, an ultra-violet filter 6. This ultra-violet filter is adapted to filter out all visible light which might be present, leaving only the invisible ultra-violet radiation.

There is provided on the side of the filter opposite the source of ultra-violet radiation 2, and in alignment with the opening 4, fluorescent means 7. This means in this particular instance is formed of a plurality of uranium glass particles united by suitable binding material capable of transmitting ultra-violet light. For ease in handling, the fluorescent material 7 is secured by said binding material to a transparent plate of glass or other vitreous material 8, capable of transmitting ultra-violet light. The plate 8 is preferably secured within a holder 9, having a handle 10 thereon, by which it may be moved into and out of alignment with the opening 4.

The object of supporting the fluorescent means 7 so that it may be moved into and out of alignment with the opening 4 is to demonstrate the phenomena of fluorescence in the presence of invisible ultra-violet radiation, and to show that such fluorescence does not take place in the absence of said invisible ultra-violet radiation, and also to show that there is in existence a beam of invisible ultra-violet light passing upwards through the opening 4.

The handles 10 used in moving the fluorescent means into and out of alignment with the opening 4, extend outwardly of slots 16 formed in the rear of the housing 1. The adjustment is made by merely pulling the handles outwardly of the housings, or vice versa.

The housing 1, as stated above, is preferably divided into separate compartments. This provides two separate units which, as shown in Fig. III, are divided by an opaque wall 11. A slot 12 is provided on the side of each unit, through which the objects 13 to be compared may be inserted. Each object 13 is supported by a bracket 5 in such a manner as to interrupt the beam of ultra-violet radiation prior to its entering the fluorescent material 7. A suitable viewing box having a sight opening 14 therein is provided whereby the effect of the means 13 on the fluorescent material 7 of each unit may be directly viewed and compared.

To prevent a spill-over of light from one unit to the other, a suitable opaque septum 15 is provided midway between the two fluorescent units.

The fluorescent means 7, although herein described as being made of uranium glass particles may be formed of eosin, fluorescein, uranium sulphate, and a variety of uranium salts, fluorspar, rhodamin, chlorophyll, esculin, resorufin, willemite, salts of salicylic acid, calcium tungstate, zinc silicate, or other suitable known means.

It is to be understood that the ultra-violet filter, although shown as being a unit comprising a single layer of means for filtering out all visible radiation and transmitting ultra-violet rays may be formed of several layers of said material or any means for accomplishing this result.

Suitable switch means 16 is provided for turning on and shutting off the sources of ultra-violet radiations.

The above described units are adapted particularly for determining the ultra-violet absorption properties of the means 13 by comparison and are placed adjacent each other, so that the said means 13, such as lenses formed of different ultra-violet absorption materials may be simultaneously viewed for said comparison.

This provides means for demonstrating by comparison that portion of the predetermined range consisting of ultra-violet radiation up to the visible spectrum. To comparatively determine the visible spectrum transmission properties of the means 13 under test, the housing 1 is provided with a compartment 17, having a source of illumination 18 therein. In the front or observer's side of the compartment 17 and in alignment with the source of illumination 18, there is provided an opening having a light diffusing screen 19 supported therein. There is also mounted in said opening, and in spaced relation with the diffusing screen 19, a vari-colored screen 20 containing a selected variety of colors covering the principal regions of the visible spectrum. These colors may be a combination of red, orange, yellow, green, blue, violet, and indigo, as separate monochromats, or they may consist of a continuous spectrum. It is to be understood that different color groups may be used. In this particular instance, the screen 20 is formed transparent and the diffused light is adapted to be projected therethrough. The space 21 between the diffusing screen 19 and the color screen 20 provides means whereby the means 13 under test may be inserted through slots 22 formed in the opposed end walls of the compartment 17.

It is apparent that if desired the means 13 need not be positioned between the diffusing screen 19 and color screen 20, but may be positioned in front of the color screen, so that the colors may be viewed by the observer through the said means 13.

The above arrangement provides means for continuing the test of the means 13 from the extreme end of the near ultra-violet region through the visible to the infra-red. The comparison of the visible spectrum absorption properties of the means under test 13 is made possible through apparent changes in the color values of the screen 20 as viewed by transmitted light passing through the means 13 under test prior or after being transmitted through the color screen 20.

The above arrangement thereby provides means for quickly comparing the effect of materials of the character described or lenses or other articles formed of said materials upon the wave length range including the region of the ultra-violet and visible spectrum up to the infra-red.

In Figs. V and VI there is shown a modified form of the invention which not only provides means for comparison of the relative ultra-violet absorption properties of different materials or lenses formed of said materials and the effect of these materials or lenses have on the visible spectrum, but also has means for determining or comparing the relative infra-red absorption properties of said materials or lenses.

The device illustrated in Figs. V and VI is generally similar to the device illustrated in Figs. I to III inclusive, only in this particular instance the materials or lenses 24 under test are supported by a bracket 25 which is pivoted at 26 to the side walls of the housing 27. Because of the fact that the support or bracket 25 is pivoted, the materials or lenses being tested or compared may be moved into alignment with either of the test units, that is, the means A for determining or comparing the ultra-violet absorption properties of the materials or lenses, the means B for determining the effect of said materials or lenses on the visible spectrum, and the means C for testing or comparing the infra-red absorption properties of said materials or lenses. The materials or lenses are placed in the holders carried by the bracket 25 through curved slots 28 formed in the side walls of the housing 27.

In order to eliminate all visible rays or rays other than the ultra-violet utilized in determining the ultra-violet absorption properties of the materials or lenses suitable flexible coverings 29 are placed over portions of the curved slots 28 adjacent the means A for determining or comparing the ultra-violet absorption properties of said materials or lenses. To enable the handle 30, carried by said means under test or comparison to be moved into position, a suitable slot 31 is formed in each of the flexible covering materials 29.

Internally of the housing 27 and contained in a separate housing 32 there is provided suitable illuminating means 33, such as high intensity capillary quartz mercury arcs, or tungsten arcs in quartz bulbs or other suitable means which will transmit ultra-violet rays, visible rays and infra-red rays. If desired, the means for producing visible rays for testing the effect of said materials upon the visible spectrum may be provided separately of the illuminating means 33 or separate illuminating means may be provided for each test.

The internal housing 32 in this particular instance is provided with an opening 34 having an ultra-violet filter 35 therein, in alignment with the fluorescent means 36. The object of this ultra-violet filter is to eliminate the visible rays and to transmit substantially only ultra-violet rays. In one position thereof the materials or lenses under test or comparison, as shown in Fig. VI, are in alignment with the ultra-violet testing or determining means A, that is, the materials or lenses are located between the means for producing the ultra-violet rays and the fluorescent means 36. To determine or compare the effect of the materials or lenses on the visible spectrum, a vari-colored screen 38 is provided generally similar to the vari-colored screen 20 previously described. In this particular instance the internal housing 32 is provided with another opening 39, in alignment with the vari-colored screen 38 and with the source of illumination 33, having a light diffusing screen 40 therein. The materials or lenses under test or comparison are brought into alignment with said means for determining the effect of said materials or lenses on the visible spectrum by swinging the bracket 25 on its pivots 26, as illustrated by the dash lines in Fig. VI. In this particular instance a separate compartment is formed by suitable flexible walls 41 and 42 which are formed of two sections having portions thereof in overlapped relation with each other so that after the materials or lenses are moved into the compartment thus formed the flexibility or resiliency of the walls 41 or 42 as the case may be, will cause them to assume their initial position wherein the portions thereof will be in overlapped relation with each other to shut out extraneous light.

To determine or compare the infra-red absorption properties of the materials or lenses, the said materials and/or lenses are moved into alignment with the means C previously referred to above.

The means C each comprise a galvanometer 43 for recording the thermoelectric changes produced by a suitable thermopile 44 when the materials or lenses under test are interposed between the source of illumination 33 and said thermopile. In order to focus the light rays coming from the source of illumination 33 onto the thermopile 44, there is provided a suitable condensing lens 45. This lens 45 is mounted in an opening in the side wall of the internal housing 32. To control the setting of the thermopile, there is provided a suitable rheostat 46.

This arrangement provides means for measuring or determining the total energy of the infra-red rays which might be transmitted through the materials or lenses under test.

It is to be understood that in order to provide means for comparison two of each of the above units A, B, and C are provided and separated by a suitable septum 47.

There is a suitable operating handle 48 carried by the pivot 26. It is positioned externally of the housing 27 so that the lenses or materials under comparison may be simultaneously moved into alignment with each of the respective test or comparing means.

From the above it will be seen that the absorption properties of various different materials or lenses, as regards their ultra violet and infra-red absorption properties as well as their effect upon the visible spectrum, may be quickly and easily compared or determined.

Although the fluorescent means has been shown and described as being formed of particles of uranium glass or other suitable means, it is to be understood that suitable fluorescent paints, plastics or other means might be used. In the latter cases it might be desirable, instead of projecting the ultra-violet light rays through said fluorescent means, to provide means for causing the light to directly impinge upon said fluorescent means or be reflected thereon, in which case the materials or lenses under test would be interposed between the ultra-violet ray producing means and the fluorescent means in a similar manner to that set forth above.

From the foregoing description it will be seen that simple, efficient, and economical means have been provided whereby comparison of different articles of commerce as to their efficiency as regards their ultra-violet and infra-red absorption properties and visible spectrum transmission qualities may be quickly and easily obtained by direct observation without requiring scientific explanation and delicate and expensive measuring apparatus.

Having described our invention, we claim:

1. In a device of the character described, a housing having a plurality of openings and a light chamber therein, a source of radiation in said light chamber producing radiations including the visible, infra-red and ultra-violet portions of the spectrum, means for directing substantially only ultra-violet radiations through one of said openings in the housing, means for directing visible radiations through another of said openings in the housing and means for directing infra-red radiations through another of said openings, fluorescent means in alignment with the opening through which the ultra-violet radiations are directed, vari-colored means in alignment with the opening through which the visible rays are directed, and means in alignment with the opening through which the infra-red rays are directed for measuring or determining the energy of said infra-red rays, and a supporting member pivotally attached to said housing for supporting means to be tested for movement in alignment with the respective openings in the housing between the source of radiation and said openings.

2. In a device of the character described, a housing having a chamber with a source of ultra-violet light therein, a test chamber adjacent said light chamber and having a test wall in alignment with said light source, fluorescent means lying completely within said test chamber and between the test wall and the light source, dividing means between said chambers including a visible light retarding member, locating means immediately adjacent said fluorescent means and adapted to position an article under test for ultra-violet ray transmission properties, in close overlying relation with said fluorescent means, so as to prevent action of the fluorescent means in immediate alignment with said article under test, by ultra-violet rays other than those passing through said article, and an observation passageway leading from said test chamber in angled relation to and in direct visible alignment with the said fluorescent means and with the said test wall.

3. In a device of the character described, a base, an upright chamber on said base, a source of ultra-violet light in said chamber, a test chamber supported by said upright chamber and having a test wall in alignment with said light source, a dividing wall between said chambers and having an opening therethrough overlying said light source, a visible light retarding member lying completely within said light chamber, and overlying said opening, locating means immediately adjacent and between the said retarding member and the said fluorescent means and being adapted to position an article under test in overlying relation with said opening, and in close proximity with said fluorescent means and retarding member so as to prevent action on the fluorescent means in immediate alignment with said article, by ultra-violet rays other than those passing through said article, and an observation passageway supported by said test chamber and extending outwardly in angled relation and in direct visible alignment with the said fluorescent means and with said test wall.

WILLIAM F. PECK.
JAMES Y. TAYLOR.